United States Patent Office 3,393,138
Patented July 16, 1968

3,393,138
ALUMINUM ALLOY ANODE AND METHOD OF USING SAME IN CATHODIC PROTECTION
Roy A. Hine, Banbury, England, assignor to Aluminium Laboratories Limited, Montreal, Quebec, Canada, a company of Canada
No Drawing. Original application May 1, 1962, Ser. No. 191,430. Divided and this application Apr. 7, 1965, Ser. No. 446,426
Claims priority, application Great Britain, May 11, 1961, 17,277/61
2 Claims. (Cl. 204—148)

ABSTRACT OF THE DISCLOSURE (1) A sacrificial aluminum anode for the cathodic protection of a metal body in sea water, and the method of protection using this anode, consisting essentially of tin, 0.01–2%; gallium, at least 0.005%, certain specified possible impurities; and the balance aluminum.

(2) A sacrificial aluminum anode for the cathodic protection of a metal body in sea water, and the method of protection using this anode, consisting essentially of tin, 0.01–2%; zinc, 0.5–10%; certain possible impurities; and the balance aluminum.

---

The instant application is a division of application Serial No. 191,430, filed May 1, 1962, now U.S. Patent No. 3,321,305.

The present invention relates to the protection of iron and steel structure against corrosion by contact with sea water by the employment of sacrificial metal anodes for the cathodic protection of metal structures.

It has long been known that the corrosion of metal, for example, iron and steel, my contact with an electrolyte can be largely or completely prevented by making the metal cathodic by electrically connecting a suitable anode metal to it.

One of the principal applications of cathodic protection is in the case of iron and steel subjected to corrosion by contact with sea water. Thus the hulls of ships, the storage tanks of tankers which may be filled with sea water as ballast and stationary steel structures, such as jetties, may all be protected in this way to prevent or reduce the corrosion of exposed portions of the metal.

For use as a sacrificial anode the anode metal must be given a suitable shape then electrically connected with and situated in close proximity to the iron or steel part to be protected. However, many shapes and constructions of sacrificial anodes are already known for this purpose. The anode metal is usually cast around an iron or steel core, by means of which it is secured to the iron or steel to be protected. The selection of a suitable shape presents no problems to one skilled in the art and the shape and construction of sacrificial anodes forms no part of the present invention.

It is generally accepted that steel or iron will not rust in sea water if its potential (expressed relative to a standard copper-copper sulphate electrode) is more negative than —0.85 volt. Steel immersed in sea water without cathodic protection usually has a potential of about —0.6 volt.

The maintenance of the steel or iron at a negative potential which will prevent corrosion may be achieved by connecting it electrically to a sacrificial anode of a more electro-negative metal. Magnesium or a magnesium-base alloy has been used to form an anode for this purpose, as also has zinc and aluminum-zinc alloys.

Aluminum is theoretically a better metal than magnesium to employ in the construction of an anode for cathodic protection of iron or steel, since (at theoretically perfect efficiency) one ampere hour is provided by the dissolution of 0.335 gram of aluminum as compared with 0.454 gram of magnesium, so that, other things being equal, it might be expected that aluminum would have a wide application for the production of anodes for cathodic protection. The difficulty however, lies in the fact that aluminum of commercial purity is not sufficiently or consistently electronegative to serve as a sacrificial anode for cathodic protection against the effects of sea water.

Magnesium undoubtedly gives very satisfactory protection and maintains the steel or iron at a high negative potential. Owing to the unduly-negative electrode potential of magnesium a strong galvanic current still flows even when the steel has been polarised to a protective level, with the result that anode material is wasteful and uneconomically consumed.

It will be appreciated that the greatest economy of anodic material will be achieved if the negative potential of the cathodically protected metal is kept down to a figure which is not unduly in excess of that required to protect it from corrosion.

Zinc and aluminum-zinc alloys have less negative electrode potentials than magnesium and they are therefore more economic in use, especially when consideration is given to their electrical output in terms of ampere-hours in relation to cost of metal. However, in a number of applications it is essential that the polarisation of the steel to a protective potential shall be brought about in as short a time as possible; such situations arise, for example in ships' ballast tanks (oil tankers, ore carriers, etc.) where the ballast water may only be present for short and intermittent periods. During these periods of intermittent immersion the anode must rapidly bring the steel structure to protective potential and moreover should cause the electrochemical deposition of calcium and magnesium compounds on the steel cathode as an adherent film which serves to protect the steel when not immersed in sea-water. The less negative potential of zinc and aluminum-zinc alloys results in a rate of polarisation of the steel which is too low for intermittent immersion applications, unless masses of anode material having unduly large surface areas are used or unless unduly large numbers of individual anodes are mounted at relatively small intervals over the steel surface. For this reason magnesium anodes have been favoured for protection of ballast tanks etc., despite the disadvantage of wasteful consumption.

In the selection of a material for use in a sacrificial anode, the initial negative potential provided by the anode is not the only quality which has to be considered. The potential must also be maintained at a satisfactory level over a long period, so that the anode does not have to be discarded prematurely.

In experimental work we have found that aluminum, containing the usual commercial impurities within certain ranges becomes markedly more electronegative by being alloyed with a small amount of tin, (in excess of 0.01%). The electronegative character of this alloy would appear to make it suitable for use in a sacrificial anode for cathodic protection of steel and iron against sea water corrosion, but corrosion tests conducted with aluminum-tin alloy containing 0.2% tin were disappointing, as it was found that the negative potential of steel sheets employed in the test fell in about two months to a voltage of about —0.83 volt and this figure was not sufficiently electronegative for wholly effective cathodic protection of iron and steel structures against sea water corrosion, as was evidenced in the test by the formation of a thin black oxide film (though without red rust) on further immersion of one year, during which the negative potential remained substantially constant.

In particular the potential developed was not negative enough to permit anodes of this material to be used in ships ballast tanks.

It has been found that there are several factors which have to be taken into consideration before a commercially acceptable anode can be prepared from aluminum tin-alloys.

Firstly the alloy must have a structure such that the tin is held as a fine precipitate dispersed throughout the alloy matrix and not in the form of localised particles in the grain boundaries.

The desired structure can be achieved by the direct chill casting process, in which the molten metal is rapidly cooled and solidified by passing the metal continuously through a chilled neck, so that during solidification there is insufficient time to permit the tin to migrate to the grain boundaries. An iron or steel core is preferably cast into the metal at the same time. Alternatively the tin may be dispersed through the aluminium by a heat treatment after the alloy has been cast in a permanent mould about an iron or steel core. The heat treatment may comprise a solution heat treatment at 500–530° C. for 4 to 24 hours, followed by cold water quenching and then artificial ageing for 4 to 24 hours at 165° C. The artificial ageing may be carried out at a higher temperature, such as 200° C. for a shorter time, but in general it may be said that the more slowly the ageing treatment is carried out, the better the final product will be.

It is also found that the presence of certain elements in very small quantities can have an appreciable effect on the ultimate product. These elements are present as impurities within tolerable levels in many, but not all, samples of aluminum of commercial purity and correctly selected aluminium of commercial purity may therefore be employed as a base for the preparation of aluminum-tin alloy material for use in sacrificial anodes for the cathodic protection of iron and steel structures.

Most of the impurities present in commercial purity aluminum have an adverse effect on the galvanic properties of the alloy and therefore it is desirable to select 99.8% commercial purity aluminum as the base metal for the preparation of the alloy.

Zinc above a certain level of impurity is found to have very deleterious effects on the final product, although it is perfectly tolerable when added in much larger quantities, such as 5%, used in known aluminum-zinc alloys already employed as sacrificial anodes. In fact, zinc is tolerable when added in amounts greater than 0.5%. It is, however, found that there is a minimum value for the content of gallium, except when zinc is present in quantities in excess of 0.5%.

According to the present invention an aluminum-tin alloy for use as a sacrificial anode includes:

Tin 0.01 to 2%
Zinc 0 to 0.05% or 0.5–10%
Gallium above 0.005% minimum, except when zinc is 0.5–10%
Copper 0 to 0.015%
Magnesium 0 to 0.05%
Silicon 0 to 0.25%
Iron 0 to 0.35%
Titanium 0 to 0.01%
Manganese 0 to 0.1% the tin being dispersed throughout the allow matrix, the balance being aluminum and inconsequential impurities.

In order to obtain the best results the levels of certain elements should be held down below certain maxima. These are copper 0.005%, magnesium 0.01%, titanium 0.005% and zinc 0.001%. The levels for other elements are preferably iron 0.08% and silicon 0.06%. The values for iron and silicon are not maxima, but merely represent a desired level of these elements, being about the level in which they are normally present in commercial purity aluminum of 99.8% purity.

When zinc is present in the range of 0.5 to 10%, gallium is so more than an inconsequential impurity. When zinc is present only as impurity, the preferred level of the then essential element gallium on the other hand is in excess of 0.015% and in fact this amount of gallium may be found in selected commercial available 99.8% purity aluminum.

Additional impurities such as boron, which may be added in very small quantities for grain refinement purposes, may be tolerated.

A binary alloy of aluminum and tin (without the added zinc content) prepared in accordance with the present invention has an electrode potential intermediate between that of zinc and that of magnesium; this potential is sufficiently negative to enable an anode of the alloy to bring a steel structure rapidly and effectively to a protective potential, but not so unduly negative that the anode material is wastefully consumed. The following table shows the electrode potential of the aluminum-tin alloy with respect to other materials, the potentials being measured in sea-water against a copper/copper sulphate auxiliary electrode.

| Anode metal: | Volts |
| --- | --- |
| Zinc | −1.05 to −1.10 |
| Aluminum-5% zinc | −1.05 to −1.10 |
| Aluminum-0.2% tin | −1.40 |
| Magnesium | −1.50 to −1.70 |

The above description of the advantages of the aluminum-tin alloy for protection of intermittently-immersed structures does not, of course, preclude its use for any other application.

In experiments carried out with the alloys made to the preferred composition above stated an anode was prepared in the form of a cylinder 4 in. diam. x 6 in. long and electrically connected to a large steel sheet suspended in sea water. The potential of the steel was rapidly brought to −1.18 v. and after 2 years continuous immersion the steel potential was measured as −0.96 v., the steel thus having been completely protected for this period. In distinction, a magnesium alloy anode of similar size was connected to a similar steel sheet and brought the potential of the steel to −1.25 v.; the potential of the steel was maintained at about this value for 5 months but then rapidly changed to a value indicative of failure of protective current; at this point it was found that the anode was completely consumed.

In a further experiment fifty-two anodes were installed in a wing cargo-tank of an ocean-going oil tanker, the cargo tank contains sea-water ballast for about 25% of the time. After 2 years the steel-work was found to be un-rusted and covered with a thin adherent calcareous film. At this time the anodes were estimated to be about ⅓ consumed. In distinction other anodes, which contained 0.03% zinc impurity in the alloy (but were otherwise of the same or similar composition) had failed to protect the steel and were clearly polarised to an inactive state, as evidenced by there being almost no reduction in their original dimensions.

Where a sacrificial anode is to be employed for applications, such as an external anode on a ships hull or a buoy or wharf where the fact that a spark might be caused if the anode fell, would be immaterial, it is preferred to use a tin content of about 0.2%.

In application to the tanks of oil tanker ships, one of the principal applications for sacrificial anodes, it is preferred to use a somewhat more expensive alloy having a tin content of about 0.5–0.6%. It is found that the increase in tin content above 0.2% does not have any appreciable effect on the galvanic properties, but it is found that the tendency to spark as measured by a drop test is reduced when the tin content is increased. The drop test consisted in dropping a 27 lb. anode from a height of 20 feet onto a rusty steel plate. It was found that with a higher tin content there was a significant reduction in the number of occasions in which a spark was produced in such a test. The increase of tin content above 0.6% did not lead to any further significant decrease in sparking tendency. It was further found that the increase in tin content led to increased difficulty in securing the dispersion of the tin through the aluminum matrix. Owing to the high cost of tin relative to aluminum and to the casting difficulties, it is estimated that a tin content of 2% is a maximum from economic considerations. Thus it may be said that preferably the tin content will fall within the range of 0.1–1%.

Alloys made in accordance with the invention and containing zinc in quantities of more than 1.0% have a potential of about −1.2 v., a little more than that of the known aluminum-zinc alloys and for most applications therefore aluminum-tin alloys with zinc kept to a minimum value are preferred.

However aluminum-zinc-tin alloys having a composition within the range specified have a higher efficiency than aluminum-tin alloys and therefore are considerably cheaper to employ where the negative potential produced is sufficient.

The efficiency of an alloy in the present context may be defined as the ratio of the metal dissolved in producing current of the total weight of metal dissolved. The aluminum, tin 0.2% alloy has an efficiency of only about 30–35%. Whereas an alloy of aluminum tin 0.2% and zinc 4% has an efficiency of about 70%.

I claim:

1. A sacrificial anode consisting essentially of a ferrous metal core and a sacrificial aluminum alloy consisting essentially of tin, 0.01–2%, zinc, 0.5–10%, and the balance being aluminum and incidental impurities of copper, up to 0.015%, magnesium up to 0.05%, silicon up to 0.25%, iron up to 0.35%, titanium up to 0.01% and manganese up to 0.1%, said tin being dispersed throughout the alloy matrix as a fine precipitate rather than at the grain boundaries.

2. In the cathodic protection of a metallic body subjected to corrosion by contact with sea water utilizing a sacrificial anode in electrical contact with and in close proximity to the metal to be protected, the improvement wherein the sacrificial material of said anode is an aluminum alloy consisting essentially of tin, 0.01–2%, zinc, 0.5–10%, and the balance being aluminum and incidental impurities of copper up to 0.015%, magnesium up to 0.05%, silicon up to 0.25%, iron up to 0.35%, titanium up to 0.01% and manganese up to 0.1%, said tin being dispersed throughout the alloy matrix as a fine precipitate rather than at the grain boundaries.

References Cited

UNITED STATES PATENTS 2,565,544    8/1951    Brown _____ 204—197

HOWARD S. WILLIAMS, *Primary Examiner.*

JOHN H. MACK, *Examiner.*

T. H. TUNG, *Assistant Examiner.*